United States Patent
Scruggs (10) Patent No.: US 11,880,733 B1
(45) Date of Patent: Jan. 23, 2024

(54) METAL SURFACE CARD

(71) Applicant: InterActive Cards, Inc., Lakeland, FL (US)

(72) Inventor: Michael Scruggs, Lakeland, FL (US)

(73) Assignee: InterActive Cards, Inc., Lakeland, FL (US)

( * ) Notice: Subject to any disclaimer, the term of this patent is extended or adjusted under 35 U.S.C. 154(b) by 214 days.

(21) Appl. No.: 17/179,623

(22) Filed: Feb. 19, 2021

Related U.S. Application Data (60) Provisional application No. 62/978,931, filed on Feb. 20, 2020.

(51) Int. Cl.
| | |
|---|---|
| *G06K 19/077* | (2006.01) |
| *B32B 3/06* | (2006.01) |
| *B32B 15/082* | (2006.01) |
| *B32B 27/30* | (2006.01) |
| *B32B 3/26* | (2006.01) |
| *B32B 27/40* | (2006.01) |
| *G06Q 20/34* | (2012.01) |
| *B32B 27/08* | (2006.01) |
| *B32B 15/095* | (2006.01) |

(52) U.S. Cl.
CPC .......... *G06K 19/07722* (2013.01); *B32B 3/06* (2013.01); *B32B 3/266* (2013.01); *B32B 15/082* (2013.01); *B32B 15/095* (2013.01); *B32B 27/08* (2013.01); *B32B 27/304* (2013.01); *B32B 27/40* (2013.01); *G06K 19/07724* (2013.01); *G06Q 20/341* (2013.01); *B32B 2250/03* (2013.01); *B32B 2425/00* (2013.01)

(58) Field of Classification Search
CPC .. G06K 19/07722; B32B 3/06; B32B 15/095; B32B 2425/00; B32B 3/266; G06Q 20/341
See application file for complete search history.

(56) References Cited

U.S. PATENT DOCUMENTS

| | | | | |
|---|---|---|---|---|
| 5,497,297 | A * | 3/1996 | Kilmer ................. | H05K 5/0269 361/801 |
| 2016/0110639 | A1* | 4/2016 | Finn ................. | G06K 19/07788 235/492 |
| 2017/0308785 | A1* | 10/2017 | Kim ................. | G06K 19/07722 |
| 2018/0025261 | A1* | 1/2018 | Mosteller ............. | B32B 15/085 235/375 |
| 2018/0165567 | A1* | 6/2018 | Suthar ............. | G06K 19/07728 |
| 2019/0384261 | A1* | 12/2019 | Nam ................ | G06K 19/07722 |

FOREIGN PATENT DOCUMENTS

CN 206353897 U * 7/2017

OTHER PUBLICATIONS

CN 206353897U English translation (Year: 2017).*

* cited by examiner

*Primary Examiner* — Jasper Saberi
(74) *Attorney, Agent, or Firm* — Smith & Hopen, P.A.; Paul Murty

(57) ABSTRACT

A metal surface card in which the metal surface is formed by a metal insert configured to be retained by interlocking shapes of the metal insert and molded polymer material sandwiched between the metal insert and an opposing surface of the card which is not metal.

6 Claims, 8 Drawing Sheets

METAL SURFACE CARD

CROSS REFERENCE TO RELATED APPLICATIONS

This application is a non-provisional application which claims priority from U.S. Ser. No. 62/978,931, filed Feb. 20, 2020, the disclosure of which is specifically incorporated herein in its entirety by reference.

FIELD OF THE INVENTION

The present invention is in the field of transaction and similar cards having a metal, rather than plastic, composition.

BACKGROUND OF THE INVENTION

Metal cards are a relatively recent innovation in the financial transaction card industry having been introduced approximately a decade ago. Metal cards have become increasingly popular and have been marketed as a more prestigious variant of the familiar all plastic credit card. Added weight, rigidity, more elegant decoration and perceived ruggedness have made these cards popular with customers who desire premium quality and service. Card manufacturers are constantly trying to apply the latest advances to metal cards. Currently there is a desire to introduce contactless payment capability, biometric authentication and dynamic secret codes to metal cards.

Metal cards are available in at least two varieties: metal surface cards and embedded metal cards.

Metal surface cards have a metal surface. The metal surface can be decorated in all the ways and methods that any metal product can be decorated such as by machining, hammering, laser etching, chemical etching and embossing to name just a few. The metal can be further decorated by typical metal electro-plating processes, printing, painting and PVD (physical vapor deposition). These are meant as examples of decorating processes not as a complete and exhaustive list of all possibilities. The metal surface of the card is typically laminated to plastic films commonly used in the card industry such as PVC and PET to create the opposite surface. Special laminating adhesives are used to improve the bond between the metal and plastic film. This bond between the metal and plastic layers has been susceptible to delamination due to dissimilar expansion rates of the materials either because of temperature, moisture absorption or mechanical bending. Other issues with this type of card is difficulty embedding payment module and no easy way of connecting the payment module to antenna or other types of electronic circuits positioned below the metal surface.

Embedded metal cards have metal embedded in the core of the card with the outer surfaces of the card being PVC or other typical card material. This card has benefits over the metal surface card because magnetic media is easily applied to conventional PVC materials, the metal piece embedded in the card can be shaped so that payment module embedding is not interfered with by the metal piece and connections can be made between very thin electronic components such as antennae and the payment module even though they may be opposite sides of the embedded metal piece.

SUMMARY OF THE INVENTION

The present invention is generally directed to a molded card having a metal surface having a rear layer, a metal insert and a molded polymer material sandwiched between the rear layer and metal insert in which the metal insert is configured to be retained by interlocking shapes of the metal insert and the molded polymer material.

In further aspects of the present invention, interlocking shapes can be formed along an outside edge of the metal insert and/or within an aperture configured within the metal insert which can be filled with the molded polymer material and be configured to be larger than a payment module so that molded polymer material prevents shorting with the metal insert.

Accordingly, it is an object of the present invention to provide an improved metal surface card. This and further objects and advantages will be apparent to those skilled in the art in connection with the drawings and the detailed description of the invention set forth below.

DESCRIPTION OF THE DRAWINGS

FIG. 1 shows a metal insert (1). Also shown is a lip (2) used to form a tongue and groove connection with polymer (4) which is shown in FIGS. 2 and 2A. An aperture (3) for the payment module is also shown.

FIG. 8 shows another metal insert (1). Also shown is a lip (2) used to form a chamfer connection with polymer (4) which is shown in FIGS. 9 and 9A. An aperture (3) for the payment module is also shown. Edge (8) around the perimeter of the aperture (3) is similar to the lip (2) around the perimeter of the metal insert (1). Edge (8) provides additional strength if desired or necessary in the area of the payment module.

DETAILED DESCRIPTION OF THE INVENTION

Figure 1:
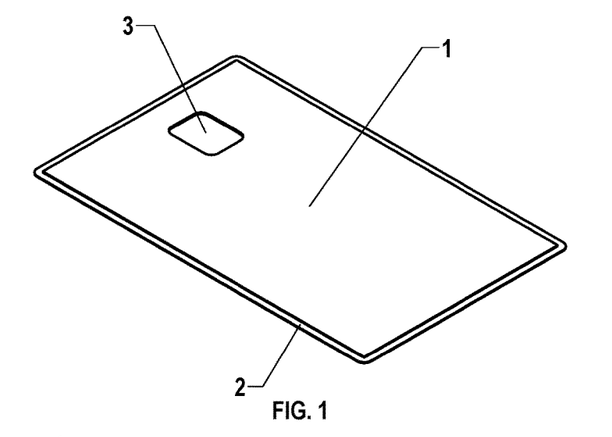
Figure 2:
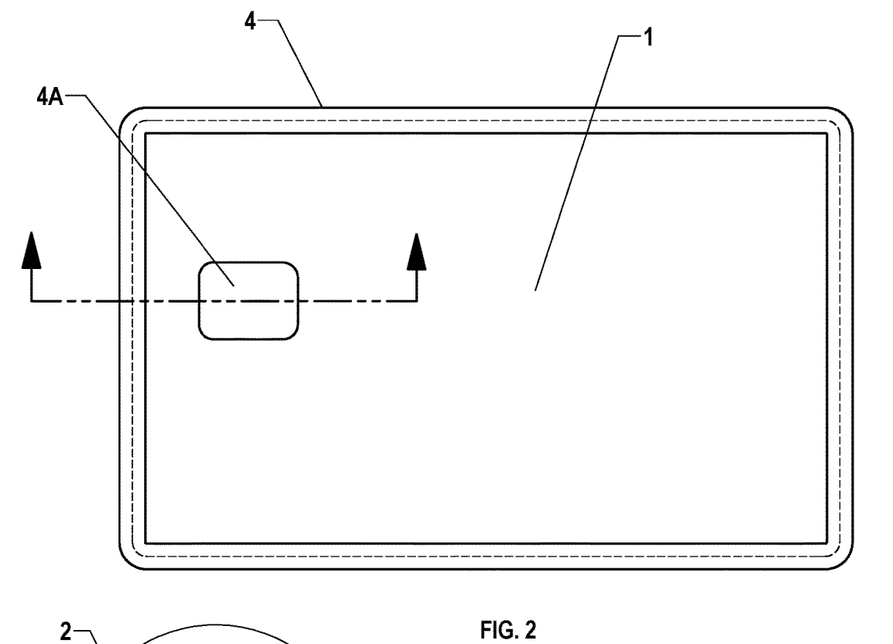
FIG. 2 is a front view of a molded card showing the metal insert (1) and the molded polymer (4) creating the edge of the card. The section line in FIG. 2 defines the partial section view shown in FIG. 2A.
Figure 2A:
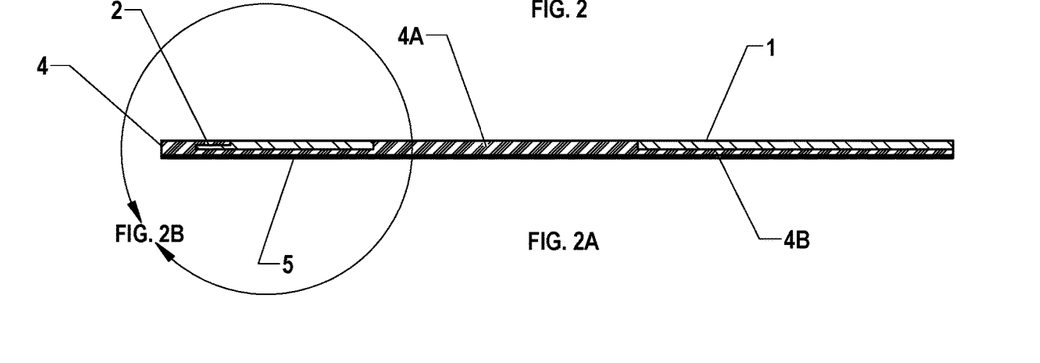
FIG. 2A shows a partial section of the left edge of the card that includes the polymer filled aperture (4A) and the tongue and groove connection created by the lip (2) of the metal insert (1) and the molded polymer (4). Also shown in FIG. 2A is polymer filled gap (4B) between the metal insert (1) and the opposite surface or rear layer (5) of the card.
Figure 2B:
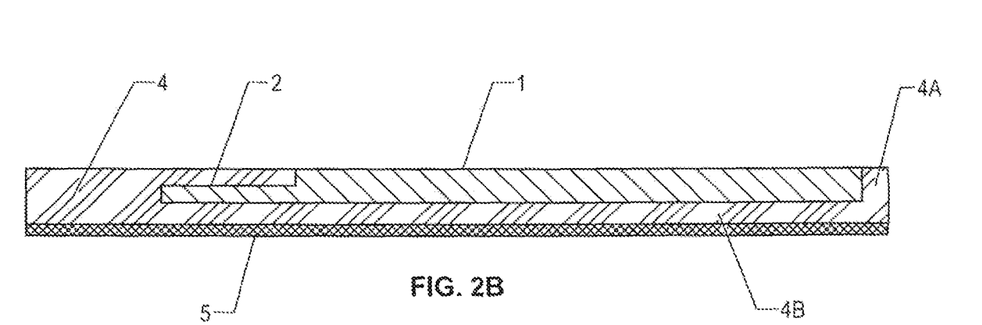
FIG. 2B is a partial blow-up of FIG. 2A.
Figure 3:
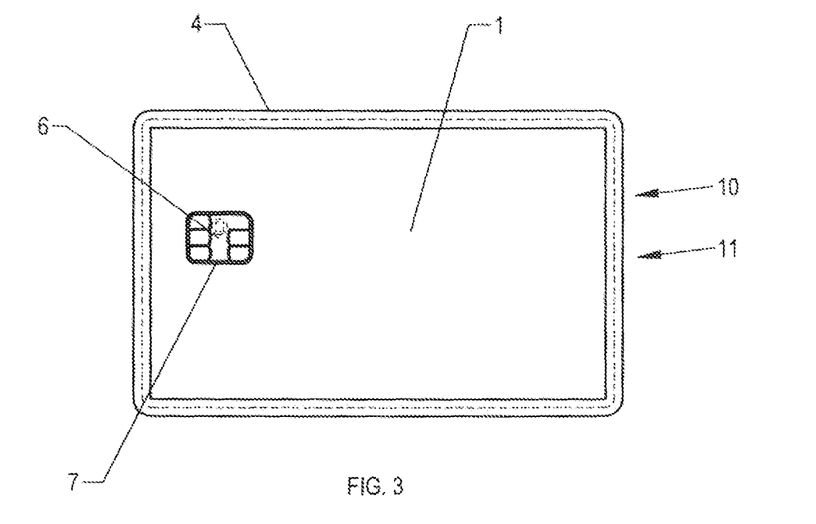
FIG. 3 shows a front view of a molded card (10) with an outer peripheral edge 11 having payment module (6) installed. Also shown is an insulating polymer boundary (7) around the installed payment module (6). This insulating polymer boundary (7) between the electrically active contacts of the payment module (6) and the metal insert (1) is made possible because the payment controller aperture (3) is made larger than the payment module.
Figure 4:
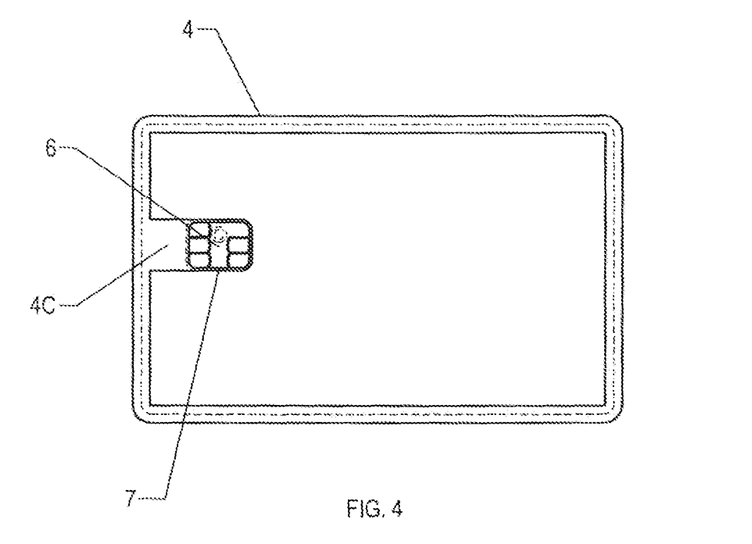
FIG. 4 shows a modification of the card shown in the prior drawings that extends the insulating polymer boundary (7) to the edge of the molded polymer (4) that creates the edge of the card. This creates a non-conductive pathway (4C) from the edge of the card to the payment module. This is useful if it is desirable to not coat the metal insert (1) with a non-conductive material to prevent shorting when the card is inserted in a point of sale terminal.
Figure 5:
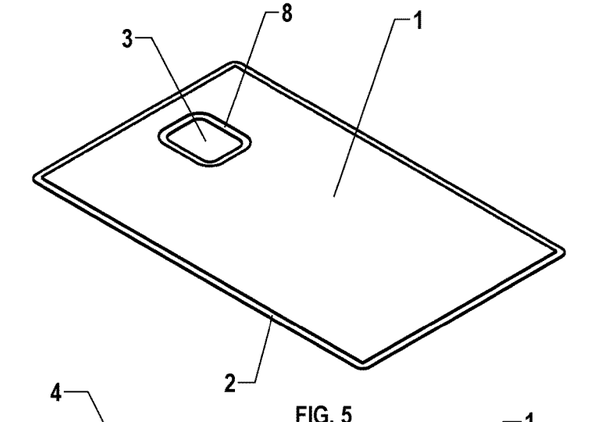
FIG. 5 shows an alternate metal insert (1) design adding an edge (8) around the perimeter of the aperture (3) that is similar to the lip (2) around the perimeter of the metal insert (1). This edge (8) provides additional strength if desired or necessary in the area of the payment module.
Figure 6:
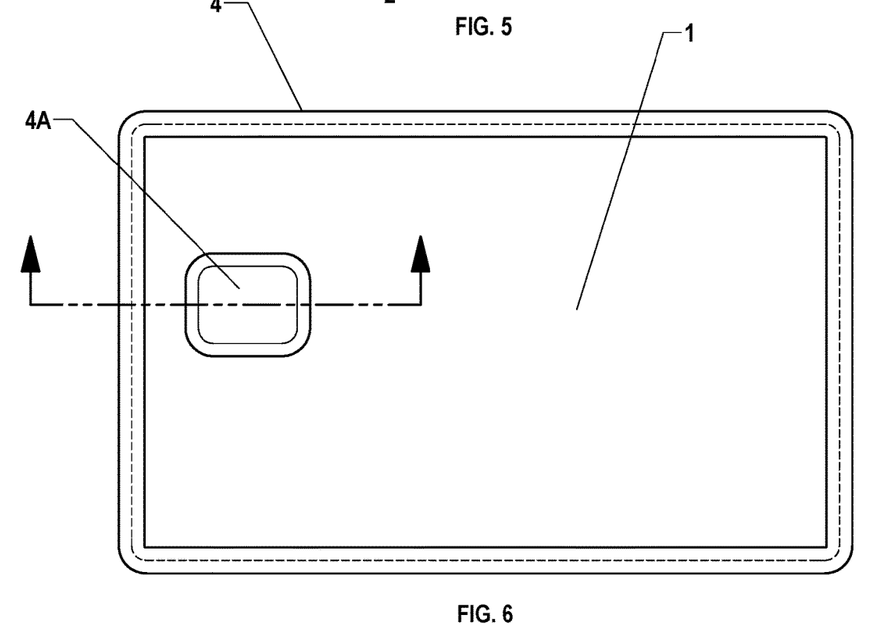
FIG. 6 is a front view of a molded card with the metal insert (1) described in FIG. 5.
Figure 6A:
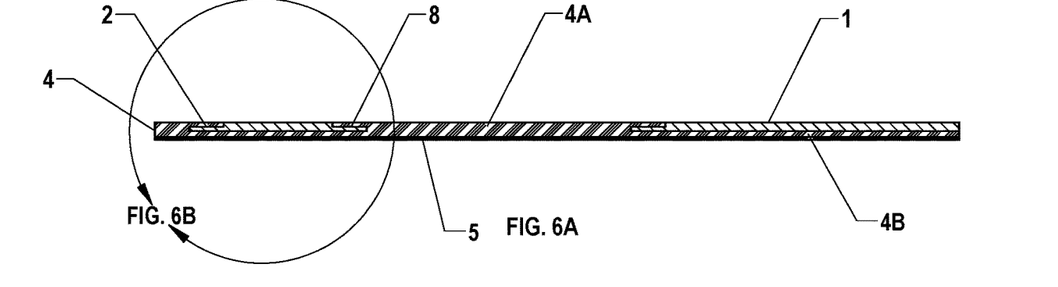
FIG. 6A shows a partial section of the left edge of the card that includes the polymer filled aperture (4A) with the edge (8) described in FIG. 5.
Figure 6B:
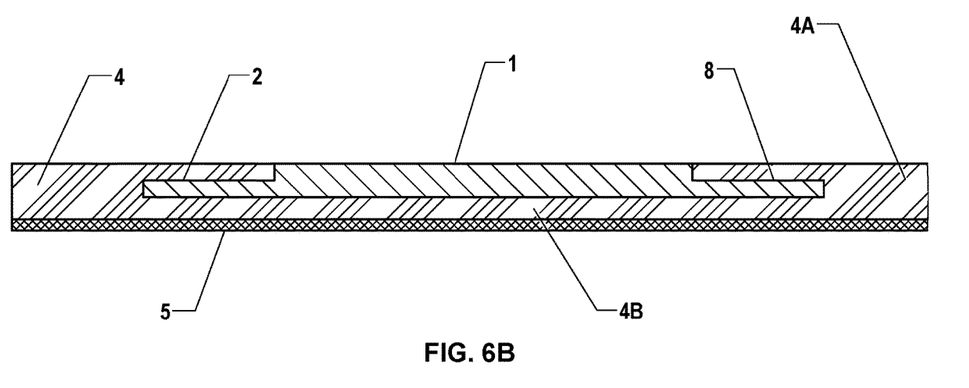
FIG. 6B is a partial blow-up of FIG. 6A.
Figure 7:
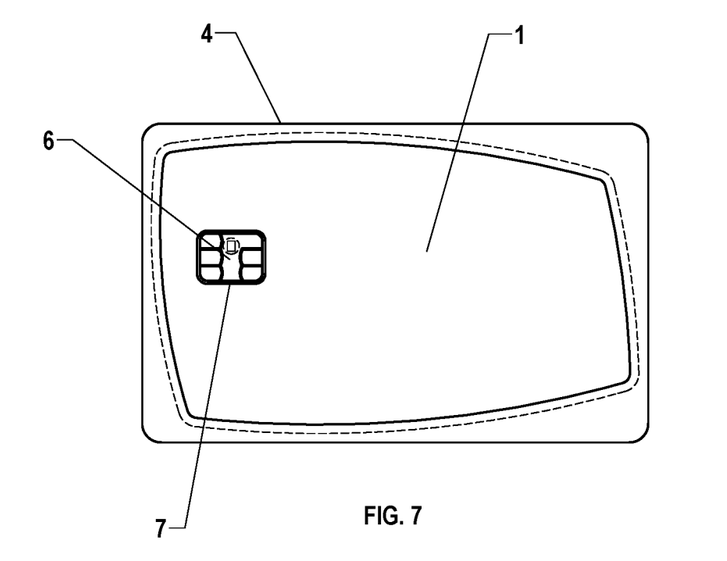
FIG. 7 shows another metal surface card having an irregularly shaped metal insert (1). The metal insert (1) does not have to be rectangular but can be shaped according to utilitarian or artistic requirements.
Figure 8:
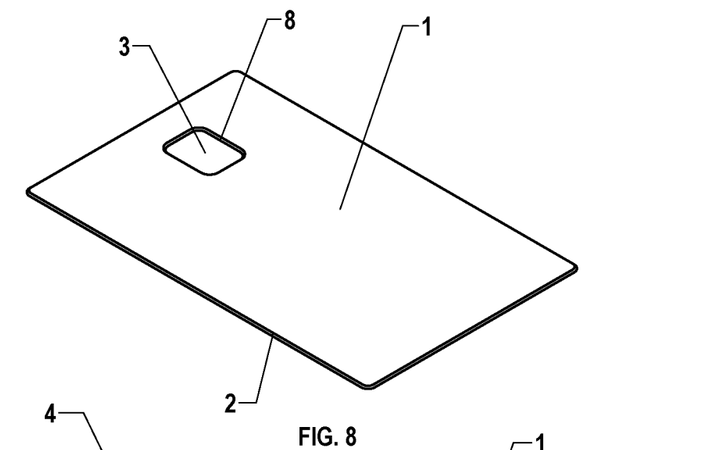
Figure 9:
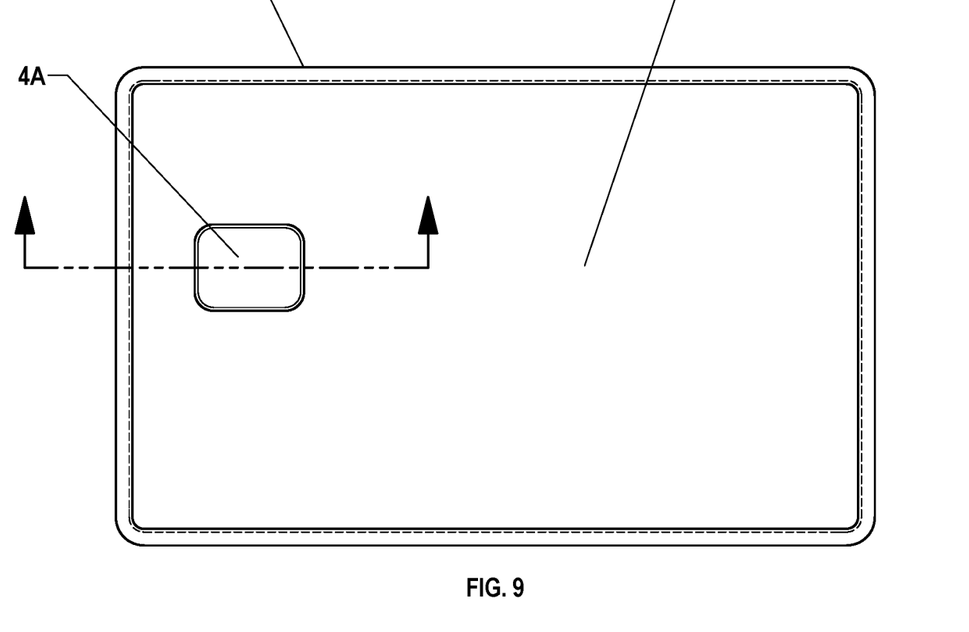
FIG. 9 is a front view of a molded card showing the metal insert (1) and the molded polymer (4) creating the edge of the card. The section line in FIG. 9 defines the partial section view shown in FIG. 9A.
Figure 9A:
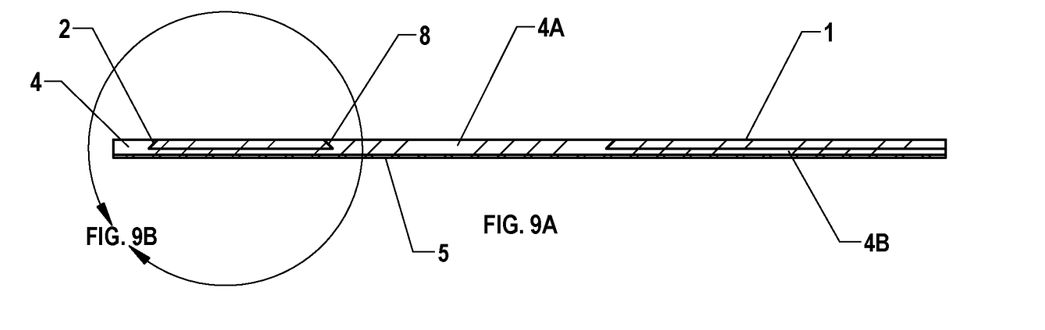
FIG. 9A shows a partial section of the left edge of the card that includes the polymer filled aperture (4A) and the chamfer connection created by the lip (2) of the metal insert (1) and the molded polymer (4) and the chamfer connection created by the edge (8) around the perimeter of the aperture (3) and the polymer filler aperture (4A).
Figure 9B:
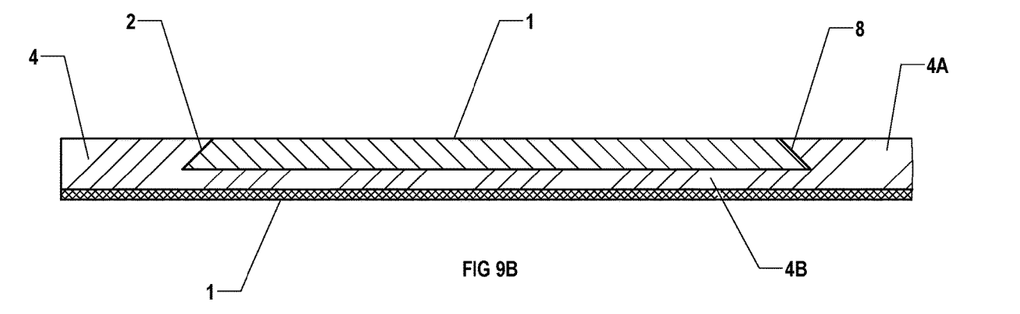
FIG. 9B is a partial blow-up of FIG. 9A.

In accordance with the present invention a molded card has a metal surface formed from a metal insert. The metal insert is configured to be retained by interlocking shapes of the metal insert and molded polymer material which is sandwiched between the metal insert and an opposing outer surface of the molded card (which may be a rear layer in the molding process with electronic components attached to an inside surface).

In one especially preferred embodiment, the metal insert does not extend completely to the outer peripheral edge of the molded card. The outer peripheral edge of the card is a molded polymer material such as polyurethane and the metal surface insert has a lip that is surrounded by the polymer material during molding. This creates a tongue and groove feature that makes delamination from the edge impossible as the metal insert is retained by the molded polymer. Additionally, the bond between the metal insert and the polymer is not critical as the metal insert is retained by the interlocking shapes of the metal insert and the molded polymer. Shapes such as tapers or other interlocking shapes can be used in place of the tongue and groove method.

It is especially desirable that the metal insert be configured with an aperture located in the position of an ISO defined payment module. The aperture can be configured with a lip or other shape around the aperture that can be surrounded by polymer material during molding. This aperture is filled during molding with the polymer material creating an easily machinable area for creating a pocket for the installation of the payment module. The polymer filled aperture also provides access to the polymer filled space between the metal insert and the opposite surface of the card. The polymer filled space can be used for electronics such as antenna, circuit boards containing batteries, displays, biometric sensors and other components. The access provided by the polymer filled aperture to the polymer filled space can be used to make electric connections between the payment module and any electronics installed in the polymer filled space. In another preferred embodiment, the aperture is larger than electronics inserted into the aperture (e.g., a payment module) and polymer filled within the aperture creates an insulation layer between electronics inserted into the aperture and the metal insert which could lead to shorting of the electronics with the metal insert absent the additional insulation provided by the polymer in the oversized aperture.

Although the molded polymer that creates any edge, filled aperture and filled space between the metal insert and the opposite surface of the card can be injection molded using a variety of molten materials, the preferred method is to inject lower temperature two-part chemistries such as reactive injection molded polyurethane or other two part resin systems. The lower temperature chemistries such as reactive injection molded polyurethane have critical benefits such as in-situ compliance with irregularly shaped electronic components and curing temperature ranges that are safe for temperature sensitive components such as batteries, thin displays and various sensors. The opposite surface or rear layer of the card can be PVC or any other material suitable for printing, magnetic stripe application or other properties desired by consumers. The material used for the opposite surface must be adhesively compatible with the polymer material.

Although the foregoing detailed description is illustrative of preferred embodiments of the present invention, it is to be understood that additional embodiments thereof will be obvious to those skilled in the art. For example, a molded card can be configured with a metal insert having outside edges defining an outer perimeter of the molded card while one or more apertures are formed inside of the metal insert whose purpose is to form interlocking shapes with molded polymer material sandwiched between the metal insert and a rear layer. Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions.

What is claimed is:

1. A transaction card having a metal surface, comprising:
   a rear layer;
   a metal insert including a main body and a lip extending perpendicularly away from the surface of an edge of the main body, the metal insert including a surface area that is smaller than a surface area of the rear layer; and
   a molded polymer material sandwiched between the rear layer and the metal insert, the molded polymer material including an edge that extends around the metal insert, such that the lip of the metal insert extends perpendicularly into an indentation of the molded polymer material that is defined by the edge of the molded polymer material, the molded polymer material including a surface area that is equal to the surface area of the rear layer;
   wherein the metal insert is configured to be retained by a planar interlocking relationship between the metal insert and the molded polymer material via the lip of the metal insert and the indentation of the molded polymer material, so as to prevent delamination of the metal insert from the molded polymer material.

2. The transaction card of claim 1, wherein the molded polymer material fills a gap between the rear layer and the metal insert.

3. The transaction card of claim 1, wherein the metal insert is configured with an aperture that is defined by an aperture perimeter.

4. The transaction card of claim 3, further comprising a planar aperture edge shape extending perpendicularly away from the surface of an edge of the aperture perimeter, wherein the planar aperture edge extends perpendicularly into a payment module indentation of the molded polymer material that is defined by the edge of the molded polymer material, such that the planar aperture edge interlocks with the molded polymer material.

5. The transaction card of claim 3, wherein the molded polymer material fills the aperture.

6. The molded transaction card of claim 5, wherein the aperture is configured to be larger than a payment module and the molded polymer material prevents shorting with the metal insert.

* * * * *